United States Patent
Wechlin et al.

(10) Patent No.: US 9,024,483 B2
(45) Date of Patent: May 5, 2015

(54) DEVICE FOR INDUCTIVE TRANSMISSION OF ELECTRICAL ENERGY

(75) Inventors: Mathias Wechlin, Kandern (DE); Andrew Green, Malsburg-Marzell (DE)

(73) Assignee: Conductix-Wampfler GmbH, Weil am Rhein-Markt (DE)

(*) Notice: Subject to any disclaimer, the term of this patent is extended or adjusted under 35 U.S.C. 154(b) by 780 days.

(21) Appl. No.: 13/383,938

(22) PCT Filed: Jul. 12, 2010

(86) PCT No.: PCT/EP2010/059995
§ 371 (c)(1),
(2), (4) Date: Mar. 30, 2012

(87) PCT Pub. No.: WO2011/006876
PCT Pub. Date: Jan. 20, 2011

(65) Prior Publication Data
US 2012/0187757 A1     Jul. 26, 2012

(30) Foreign Application Priority Data

Jul. 14, 2009  (DE) .......................... 10 2009 033 236

(51) Int. Cl.
*H01F 38/00*  (2006.01)
*B60L 11/18*  (2006.01)
(Continued)

(52) U.S. Cl.
CPC ........... *B60L 11/182* (2013.01); *B60L 11/1829* (2013.01); *H02J 7/025* (2013.01);
(Continued)

(58) Field of Classification Search
USPC ........................................................ 307/104
See application file for complete search history.

(56) References Cited

U.S. PATENT DOCUMENTS

| | | |
|---|---|---|
| 4,800,328 A | 1/1989 | Bolger et al. |
| 5,323,513 A | 6/1994 | Binder et al. |

(Continued)

FOREIGN PATENT DOCUMENTS

| | | |
|---|---|---|
| AU | 657545 B2 | 3/1995 |
| CA | 1311269 | 12/1992 |

(Continued)

OTHER PUBLICATIONS

Japanese Office Action and English translation mailed Jan. 21, 2014 for JP2012-519997.

(Continued)

*Primary Examiner* — Rexford Barnie
*Assistant Examiner* — Dru Parries
(74) *Attorney, Agent, or Firm* — Fleit Gibbons Gutman Bongini & Bianco PL; Martin Fleit; Paul D. Bianco

(57) ABSTRACT

The invention relates to a device for the inductive transfer of electric energy from a stationary unit comprising at least one primary inductance to a vehicle that is adjacent to said unit and has at least one second inductance. The stationary unit or the vehicle has a device for detecting the presence of an object in a predetermined area that covers at least the area lying between the primary inductance and the second inductance during the inductive energy transfer. The detection device has at least one contactless sensor and an evaluation unit that is connected to the sensor. At least the sensor of the detection device is integrated into or mounted on the same housing as the primary or secondary coil of the energy transfer device. The sensor can be an ultrasonic sensor, radar sensor, infra-red sensor or an electric image sensor.

12 Claims, 3 Drawing Sheets

(51) Int. Cl.
  *H02J 7/02* (2006.01)
  *B60L 3/00* (2006.01)
(52) U.S. Cl.
  CPC ............ *Y02T 10/7005* (2013.01); *Y02T 90/12* (2013.01); *Y02T 90/122* (2013.01); *Y02T 90/125* (2013.01); B60L 3/0069 (2013.01); *B60L 2240/36* (2013.01); *B60L 2270/147* (2013.01); *Y02T 90/121* (2013.01)

(56) References Cited

U.S. PATENT DOCUMENTS

| | | | |
|---|---|---|---|
| 6,028,413 | A | 2/2000 | Brockmann |
| 6,194,854 | B1 | 2/2001 | Uchibori et al. |
| 6,954,180 | B1 | 10/2005 | Braun et al. |
| 7,605,496 | B2 | 10/2009 | Stevens et al. |
| 7,880,337 | B2 | 2/2011 | Farkas |
| 8,508,077 | B2 | 8/2013 | Stevens et al. |
| 2007/0145830 | A1 | 6/2007 | Lee et al. |
| 2007/0228833 | A1 | 10/2007 | Stevens et al. |
| 2008/0265684 | A1 | 10/2008 | Farkas |
| 2009/0001932 | A1 | 1/2009 | Kamijo et al. |
| 2009/0212637 | A1* | 8/2009 | Baarman et al. ............ 307/104 |
| 2010/0156346 | A1 | 6/2010 | Takada et al. |
| 2011/0163542 | A1 | 7/2011 | Farkas |
| 2011/0285210 | A1 | 11/2011 | Lemmens et al. |
| 2011/0291491 | A1 | 12/2011 | Lemmens et al. |
| 2012/0068536 | A1 | 3/2012 | Stevens et al. |
| 2014/0001877 | A1 | 1/2014 | Stevens et al. |

FOREIGN PATENT DOCUMENTS

| | | |
|---|---|---|
| CA | 1311269 C | 12/1992 |
| DE | 3782281 T2 | 3/1993 |
| DE | 19741279 A1 | 3/1999 |
| DE | 19915487 C1 | 11/2000 |
| DE | 10258347 A1 | 7/2004 |
| DE | 69920610 T2 | 2/2005 |
| DE | 102005005906 A1 | 8/2006 |
| DE | 102007033654 A1 | 4/2008 |
| DE | 102006062492 A1 | 7/2008 |
| EP | 0379465 A1 | 7/1990 |
| EP | 0985573 A2 | 3/2000 |
| JP | 06-105408 | 4/1994 |
| JP | 1994-105408 | 4/1994 |
| JP | 07-236204 | 9/1995 |
| JP | 1995-236204 | 9/1995 |
| JP | 2001112190 A | 4/2001 |
| JP | 2006074317 A | 3/2006 |
| JP | 2006105408 | 4/2006 |
| JP | 2007015664 A | 1/2007 |
| JP | 2007126025 | 5/2007 |
| JP | 2007-236204 A | 9/2007 |
| JP | 2007236204 | 9/2007 |
| JP | 2007267578 | 10/2007 |
| JP | 2007267578 A | 10/2007 |
| JP | 2008076186 A | 4/2008 |
| JP | 2009011129 | 1/2009 |
| WO | 2005109597 A1 | 11/2005 |
| WO | 2008/051611 A2 | 5/2008 |
| WO | 2009/081115 A1 | 7/2009 |

OTHER PUBLICATIONS

International Preliminary Report published Jan. 17, 2012 for PCT/EP2010/59995.
English translation of Japanese Office Action dated Sep. 9, 2013 for Japanese patent application JP2012-519997.
International Preliminary Report on Patentability dated Jan. 17, 2012, for PCT/EP10/059995 filed Jul. 12, 2010.
Written Opinion dated Jan. 14, 2012, for PCT/EP10/059995 filed Jul. 12, 2010.
International Search Report published Oct. 3, 2011 for PCT/EP2010/059995 filed Jul. 12, 2010.
Written Opinion for PCT/EP2010/059995 filed Jul. 12, 2010.

* cited by examiner

DEVICE FOR INDUCTIVE TRANSMISSION OF ELECTRICAL ENERGY

FIELD OF THE INVENTION

The invention relates to a device for inductive transmission of electrical energy according to the preamble of claim 1. Devices of this kind are used for inductive charging of a rechargeable battery installed in an electric vehicle. During the transmission of energy, a magnetic field of high field strength and flux density is built up in a space between a stationary primary coil and a secondary coil on the vehicle. This is necessary in order to induce a sufficiently high current for the desired transmission power in the secondary coil.

BACKGROUND OF THE INVENTION

If human beings, human extremities or animals enter this space, body currents can be induced. Although it can be assumed that this usually does not lead to any direct hazard, particularly as there is no fear of protracted presence in this space, however the possibility of accidental exposure of children or domestic animals in particular to a strong magnetic field is likely to limit acceptance of inductive energy transmission in many population circles.

It must also be remembered that human beings can carry electrically conducting objects in the form of rings, armbands, tools, implants and the like on their body. For animals this applies in the form of collars. If such objects are exposed to a strong alternating magnetic field, eddy currents are induced in these which lead to heating dependent on the material, time of exposure, alignment in relation to the field and level of field strength. In the presence of such conditions, temperatures can be reached which can lead to damage and/or hazards. These could also emanate from electrically conductive objects which playing children might deliberately introduce into the area of the field of an inductive energy transmission device out of curiosity.

Due to the characteristics of existing applications for inductive energy transmission systems, such a hazard was assessed as not being relevant. In the case of vehicles with a driver, training can be conducted to draw attention to the need to look out for the presence of foreign bodies while in operation and to remove these before the inductive transmission is set in operation or to interrupt the inductive transmission in case of any doubt. However, the presence of foreign bodies in the area of the field appears to be an obvious safety problem for largely automatic operation or with higher safety requirements which must be assumed when such systems are used in areas accessible to the public. Here, the introduction of a foreign body while the energy transmission is operating is particularly critical, because it cannot be assumed that the driver of a vehicle will be observing the area of the field, i.e. the space between the housings of the primary coil and the secondary coil during the transmission of energy. Furthermore, the vehicle will usually be completely unsupervised during the major part of a charging operation.

From US 2007/0145830 A1 a system for the wireless transmission of electrical power to electronic devices is known, which comprises a plurality of primary coils, thereby eliminating the need for precise alignment of a primary and a secondary coil relative to each other. In this document, the problem of the presence of metallic objects is mentioned, but a metal detector is dismissed as being unusable. Rather, by suitable circuit design it is ensured that the system only enters its resonant state when a resonant circuit comprising a secondary coil and a tuning capacitor connected in parallel approaches the primary side, thereby causing a steep increase of the primary current, which is concentrated on one or a few primary coils immediately near the secondary coil. A conductive object represents no problem in this case, because it does not constitute a resonant circuit.

SUMMARY OF THE INVENTION

Therefore, the underlying object of the invention is to improve the operating safety of an inductive energy transmission system with regard to the presence of foreign bodies in the area of the field.

According to the invention, this object is achieved through a device with the features of claim 1. Advantageous variants are disclosed in the subordinate claims.

According to the invention, with a device for inductive transmission of electrical energy from a stationary unit with at least one primary inductor to a vehicle standing in the vicinity hereof and having at least one secondary inductor, the stationary unit or the vehicle has a device for detecting the presence of an object inside a predetermined space which at least comprises the space lying between the primary inductor and the secondary inductor during the transmission of energy. This makes it possible to detect the introduction of a foreign body into the area of the field produced by the energy transmission and to react in a suitable manner.

A single contactless sensor can be provided, for example in the form of an ultrasound, radar or infrared sensor or an electronic image sensor, or a plurality of such sensors can be provided which expediently are at least partly installed in the same housing as the primary inductor or the secondary inductor of the energy transmission device or attached to it.

Possible criteria for detection of the presence of a foreign body in the area of the field produced by the energy transmission are the deviation of a sensor signal from a reference value or signal, in the case of a plurality of sensors deviations between the individual sensor signals, and a change of time of a sensor signal. In particular, the last named criterion offers a typical indicator for the introduction of a foreign body into the area of the field produced by the energy transmission. Expedient reactions to the presence of a foreign body include in particular the emission of a warning signal, the deactivation of the current supply of the primary inductor and its reactivation when the foreign body leaves the area of the field again.

BRIEF DESCRIPTION OF THE DRAWINGS

In the following, embodiment examples of the invention are described with reference to the drawings in which.

DETAILED DESCRIPTION OF THE INVENTION

Figure 1:
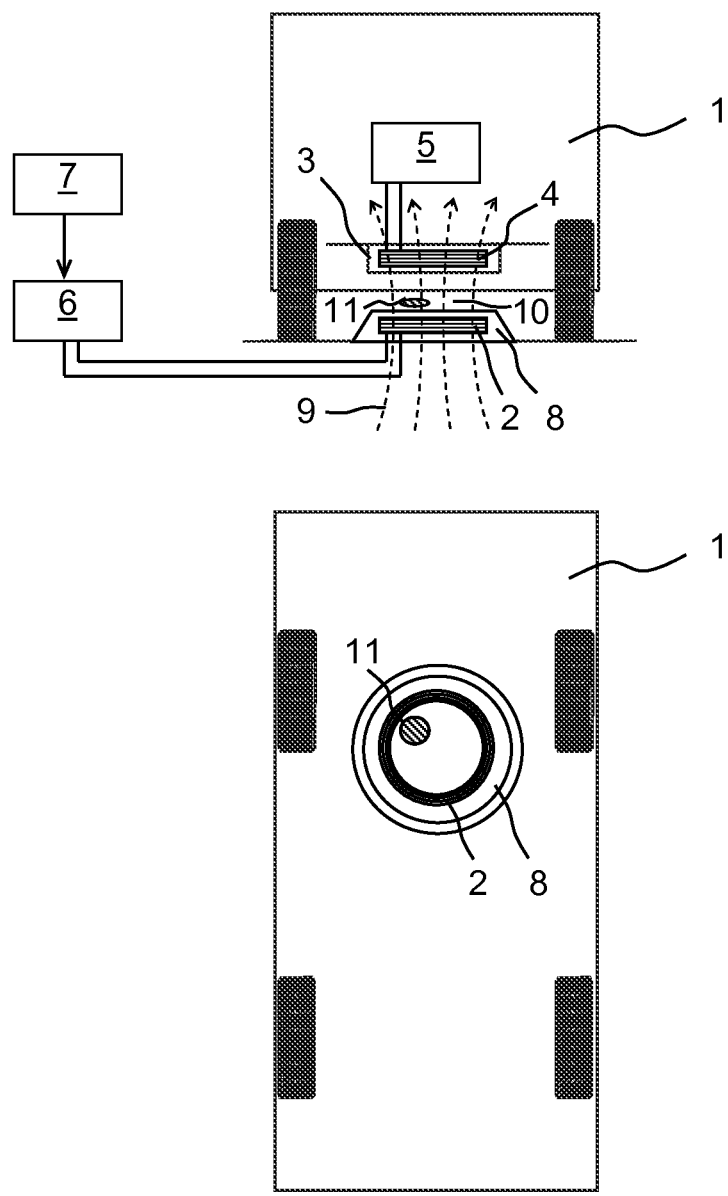
FIG. 1 shows a diagrammatic illustration of a charging station for inductive transmission of energy with an electric vehicle in a charging position.

FIG. 1 shows a diagrammatic sectional view (at the top) and a diagrammatic plan view (at the bottom) of an electric vehicle 1 standing over the primary coil 2 of a charging station to charge its battery. On the underside of the vehicle 1 in a housing 3 there is a secondary coil 4 which is connected to an electronic charging unit 5. This converts the parameters of the electric power transmitted inductively to the secondary coil 4 into suitable values for charging the battery of the vehicle 1. The primary coil 2 is fed by a current supply unit 6 of the charging station and is located in a housing 8 which is positioned statically in a vehicle parking bay. The current supply unit 6 is controlled by a control unit 7 of the charging station.

Some of the field lines 9 of the alternating magnetic field produced by the primary coil 2 while in operation are indicated by the dashed lines in FIG. 1. The main direction of the field is the direction of the coil axis of the primary coil 2 and thus the vertical direction. A high magnetic field strength and flux density prevails while in operation in the space 10 immediately above the housing 8 of the primary coil 2. This is the precise location of a foreign body 11 which is exposed to a hazardous potential as explained previously.

Figure 2:
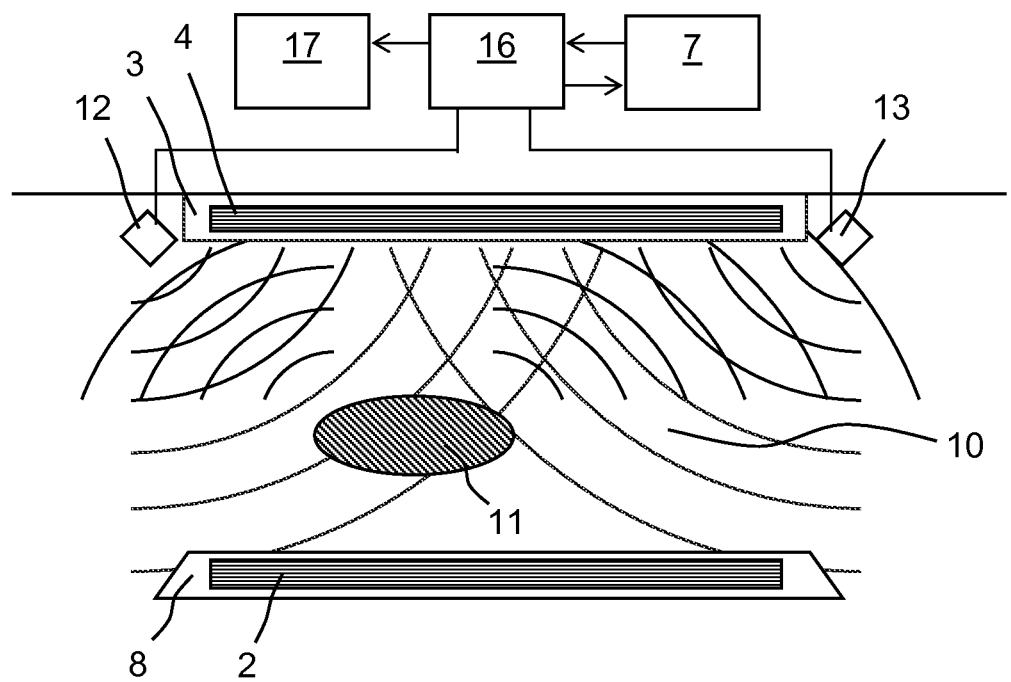
FIG. 2 shows a diagrammatic illustration of the detection of a foreign body by an arrangement according to the invention with a plurality of sensors.

FIG. 2 shows an example of a sensor arrangement according to the invention for detecting the foreign body 11 in a view which corresponds to an enlargement of a detail, namely the immediate vicinity of the primary coil 2 and the secondary coil 4, from the upper part of FIG. 1. Arranged in the immediate vicinity of the housing 3 of the secondary coil 4 there are two sensors 12 and 13 which are of the same type and work on a contactless operating principle. In total, two further sensors 14 and 15 of the same kind are provided, which can be seen in the plan view of FIG. 3 but not in FIG. 2. The four sensors 12 to 15 are arranged at least approximately symmetrically in the form of a square or rectangle.

Figure 3:
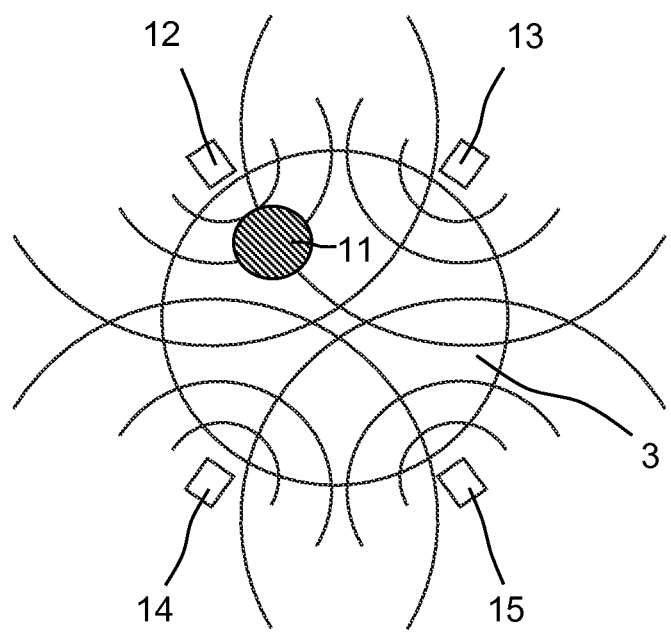
FIG. 3 shows the sensor arrangement in FIG. 2 in a diagrammatic plan view and FIG. 4 shows a sensor arrangement with only a single sensor.

As indicated by wave fronts in FIG. 2 and FIG. 3, when activated the sensors 12 to 15 emit wave-shaped signals which are reflected by the foreign body 11, the reflection being dependent on the position, size and material of the foreign body 11. The sensors 12 to 15 receive the reflected signals and in each case emit a measurement signal which depends on the reflection signal received, to an evaluation device 16. The sensors 12 to 15 can be for example ultrasound, radar or infrared sensors. They are activated before the start of the inductive energy transmission by the evaluation device 16, for which this receives a signal indicating the impending start of energy transmission from the control unit 7 of the charging station.

As an alternative to active sensors 12 to 15, use can also be made of passive sensors, for example passive infrared sensors on a pyroelectric basis, as commonly employed in movement sensors for controlling lighting. Such sensors react to thermal radiation and are therefore particularly suitable for detecting living beings or the parts of bodies of living beings with a higher temperature than the surrounding area, i.e. for the detection of a particularly critical type of foreign body 11.

The measurement signals supplied by the individual sensors 12 to 15 are continuously compared with one another and possibly with reference values or reference signals in the evaluation device 16. With the sensor arrangement shown in FIG. 3, without the presence of the foreign body 11, the signals transmitted by the sensor 12 would be reflected by the surface of the housing 8 of the primary coil 2 mainly in the direction of the facing sensor 15 and only to a very tiny degree back to the transmitting sensor 12. The same applies to the two sensors 12 and 15 in the reverse direction as well and to the other two facing sensors 13 and 14 in both directions. However, in the presence of the foreign body 11, the reflection back to the transmitting sensor is much stronger. This is a first possible criterion for detection of a foreign body 11 by the evaluation device 16 on the basis of the measurement signals from the sensors 12 to 15.

Moreover, the strength of the reflected signals when the foreign body 11 is positioned unsymmetrically in relation to the sensors 12 to 15, as shown in FIGS. 2 and 3, is different at the individual sensors 12 to 15. Even if a moving foreign body 11 comes to rest in a symmetrical position in relation to the sensors 12 to 15 by chance, its position as it is introduced into the area 10 of the field produced by the transmission of energy initially along its path of movement is unsymmetrical. Therefore, differences between the measurement signals of the sensors 12 to 15 offer a further criterion for detection of a foreign body 11 by the evaluation device 16.

Apart from this, there is another option for detection of a foreign body 11 by the evaluation device 16 by recording the variation in time of the measurement signals and monitoring them for the appearance of significant time changes. The movement of a foreign body 11 in the space 10 monitored by the sensors 12 to 15 can in fact be detected in the measurement signals from the sensors 12 to 15 by the appearance of significant time changes. It is obvious that the introduction of a foreign body 11 into the monitored space 10 from the exterior is necessarily also connected with a movement inside the space 10.

The three criteria named previously can be applied by the evaluation device 16 to the measurement signals from the sensors 12 to 15 either individually or in parallel with one another and in the last-named case also linked to one another according to suitable heuristic rules. For example, to avoid false alarms, it may be required that all three criteria or at least two out of three criteria indicate the introduction of a foreign body 11 before a foreign body is regarded as detected. In addition, it is also possible to require that criteria indicating the presence of a foreign body 11 must always be satisfied for an interval of time of predetermined minimum length before a foreign body 11 is finally regarded as detected in order to avoid detection errors.

If a stationary foreign body 11 is also to be detected, the monitoring of changes in the measurement signals for this is naturally not suitable as a detection criterion for this and the comparison of the different measurement signals is only suitable to a limited degree as a foreign body 11 lying symmetrically by chance would not be detected. However, the detection of the subsequent introduction of a foreign body 11 into the area 10 of the field after the vehicle 1 is parked is primarily of interest as this is always combined with a change and an asymmetry of the different measurement signals.

Regardless of which criteria are used in the evaluation device 16 for detection of a foreign body 11 and whether and how different criteria are associated with one another, whenever it detects a foreign body 11, the evaluation device 16 sends an output signal to an indicating device 17 which emits an optical and/or acoustic warning. Apart from this, the evaluation device 16 is also connected with the control unit 7 of the charging station and sends this a signal which interrupts the energy transmission, i.e. the supply of current to the primary coil 2. In addition, a message is sent to a suitable location, e.g. to the operator of the charging station or to the driver of the vehicle 1.

In practice it is enough not to react immediately as soon as a movement of a foreign body 11 is detected in the area 10 of the field, but to wait until it can be assumed that it is not just a momentary passage through the area 10 of the field. When it is established that a human being or an animal is completely or partly in the area 10 of the field produced by the energy transmission, initially a warning can be given by means of suitable measures, for example using the vehicle horn as an indicating device 17. If the foreign body is not confirmed as having left the space 10 being monitored within a certain time, the transmission of energy can be interrupted, i.e. the current supply unit 6 of the primary coil 2 can be deactivated by means of the control unit 7. When the transmission of energy is interrupted, the monitoring of the space 10 is continued. If the foreign body is later confirmed as having left the area being monitored, the transmission of energy is resumed directly. However, if the present status persists, a message can be sent to a competent location which checks the situation, corrects it if necessary and confirms the correction. If the transmission of energy is interrupted for a longer period or terminated so that it does not seem possible to transmit sufficient energy, a corresponding message is given to the driver of the vehicle 1 or to a higher level installation controller in the case of automated operation.

In FIGS. 2 and 3 it is assumed that the sensors 12 to 15 are arranged on the vehicle in the area of the secondary coil 4. The indicating device 17 can be produced on the vehicle, e.g. in the form of use of the existing vehicle horn, or outside the vehicle as a component of the charging station. The control unit 7 is not located onboard the vehicle 1 but is a part of the charging station. As a result, the communication between the evaluation device 16 on the vehicle and the control unit 7 takes place wirelessly. This also applies to the indicating device 17 if this forms part of the charging station.

Figure 4:
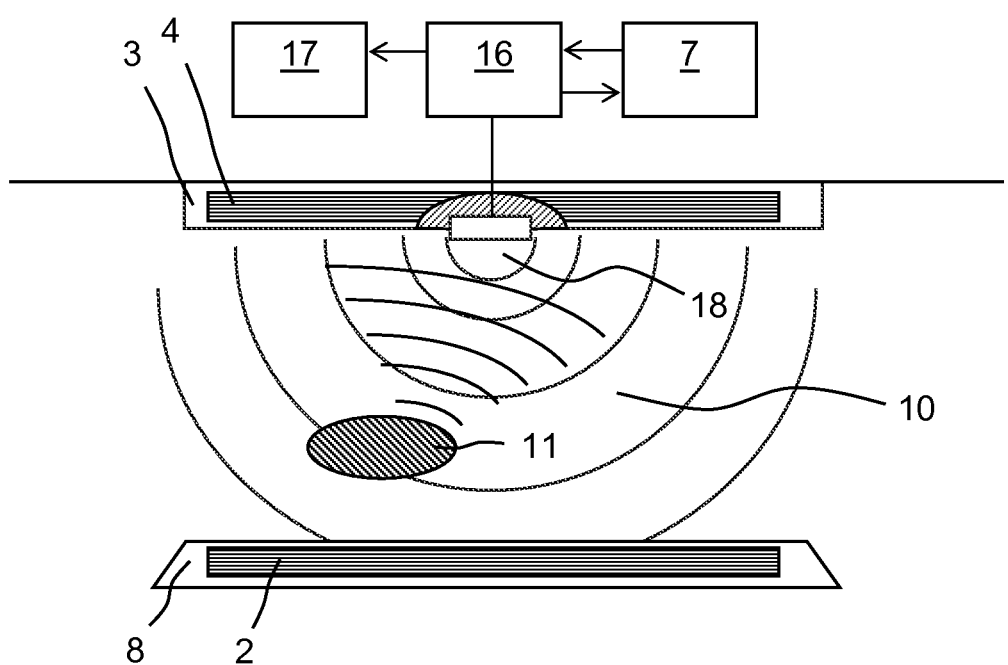

FIG. 4 shows a simplified variant of the form of embodiment of the invention described previously in which only a single sensor 18 is used. Such a single sensor 18 is best mounted centrally on the housing 3 of the secondary coil 4, and can be installed partly or wholly in the housing 3, as indicated in FIG. 4. In this case, the possibility of comparing measurement signals from different sensors as detection criterion is eliminated. However it is still possible to observe changes in time in the measurement signal produced by the sensor 18 indicative of a moving foreign body 11. With an active sensor which sends out wave-shaped signals and receives reflected signals, and receives reflected signals, the signal transit time between transmission and reception can also be considered as a detection criterion for a foreign body 11 when the transit time for reflection on the facing housing 8 of the primary coil 2 is known.

A passive sensor 18 could also be used here. This could be an electronic image sensor for example. In this case, an image of the upper surface of the housing 8 of the primary coil 2 could be stored in the evaluation device 16, and this could be compared with the image supplied by the sensor 18 after the vehicle 1 is parked. To make it easier to detect a foreign body 11, the surface of the housing 8 could be provided with a characteristic pattern in which a foreign body 11 would stand out clearly optically as an interruption. To avoid any influence by ambient light conditions, the range of the spectrum used can also lie outside the visible range, e.g. lie in the infrared range. The measurement signal of the sensor 18, which here would have the form of an image signal, could also be recorded in time and monitored for changes which would indicate the movement of a foreign body 11.

With regard to the communication with the control unit 7 of the charging station and the emission of a warning by means of an indicating device 17, the same applies to the simplified variant with only a single sensor 18 as to a solution with a plurality of sensors 12 to 15. Conversely, in the case of a solution with a plurality of sensors, these could also be wholly or partly built into the housing 3, instead of being mounted on the outside thereof as in FIGS. 2 and 3.

Although the embodiment examples described previously show the arrangement of the sensors 12 to 15 and 18 and the evaluation device 16 on the secondary side, i.e. on the vehicle side, it would be equally possible for both the system components to be arranged on the primary side, e.g. by or on the housing 8 of the primary coil 2, or to be fully or partly integrated into this housing 8. In this case, the entire system for detecting a foreign body would be concentrated in the charging station. However, it would also be conceivable to provide one or more transmitters of wave-shaped signals on one side, e.g. on the vehicle side, and one or more receivers as sensors on the other side, e.g. the primary side, so that the propagation of the waves would be disturbed by a foreign body 11 in the space 10 and the foreign body 11 could be detected by this on the receiver side. In addition, sensors could also be mounted on both sides, i.e. on both the vehicle side and the primary side at the same time.

Instead of being concentrated in a central evaluation device 16, the signal processing function could also be distributed over a plurality of individual sensors 12 to 15 or 18 so that only status reports of sensors 12 to 15 indicating whether a sensor 12 to 15 has or has not detected a foreign body 11 would come together in a reduced central evaluation device. In this case, parts of the evaluation device 16 would be formed by the sensors 12 to 15 and 18. With a single sensor, this could also be integrated with the evaluation device 16 in a common unit.

In addition, the evaluation device 16 could also be combined with an evaluation device for signals from other sensors provided in or on the vehicle 1 for other purposes. In particular there are vehicles with contactless distance sensors which are used as part of so-called driver assistance systems to assist the driver when parking and/or to help him maintain an adequate safe distance from a vehicle in front while driving. When a vehicle 1 is equipped with such a system and thus has an evaluation device for signals from contactless distance sensors, it may be advantageous from a cost viewpoint to provide no separate evaluation device 16 for the detection device according to the invention, but to process the signals from all the contactless distance sensors of the vehicle 1, including the sensors (12 to 15; 18) added by the present invention, in a single central evaluation device, i.e. simply to extend the range of functions of an evaluation device already present in the vehicle 1 accordingly.

The invention claimed is:

1. Device for inductive transmission of electrical energy from a stationary unit with at least one primary inductor to a vehicle standing in the vicinity hereof and having at least one secondary inductor, wherein the stationary unit or the vehicle exhibits a device for detecting the presence of an object inside a predetermined space which at least comprises the space lying between the primary inductor and the secondary inductor during the transmission of energy, and in that the detecting device exhibits a plurality of sensors and an evaluation device connected with the sensors, wherein the evaluation device exhibits a comparing device, which compares the signals produced by the individual sensors with one another and determines a measurement for a deviation between the signals.

2. Device according to claim 1, wherein the detecting device exhibits contactless sensor and an evaluation device connected with the sensor.

3. Device according to claim 1, wherein the sensors of the detecting device are at least partly built into the same housing as the primary inductor or the secondary inductor of the energy transmitting device or attached thereto.

4. Device according to claim 1, wherein the sensors are ultrasound, radar or infrared sensors or electronic image sensors.

5. Device according to claim 1, wherein the evaluation device exhibits a comparing device which compares the signals produced by the sensors with a reference value or reference signal and determines a measurement for a deviation from the reference value or reference signal.

6. Device according to claim 1, wherein the evaluation device determines a measurement for a change in time of the signals produced by the sensors.

7. Device according to claim 1, wherein the evaluation device exhibits at least one output at which a signal is produced which indicates the presence of a foreign body in the case of a deviation from the reference value or reference signal which exceeds a predetermined minimum amount, and/or in the case of a deviation between the signals which exceeds a predetermined minimum amount, and/or in the case of a change in time which exceeds a predetermined minimum amount.

8. Device according to claim 7, wherein the evaluation device exhibits a time-measuring device by means of which the duration of the deviation exceeding a predetermined minimum amount and/or change in time is measured, and in that the signal which indicates the presence of a foreign body is only produced when the measured duration exceeds a predetermined minimum duration.

9. Device according to claim 7, wherein an output of the evaluation device is connected with an indicating device, and in that a signal produced at the output which indicates the presence of a foreign body triggers the production of a warning signal by the indicating device.

10. Device according to claim 7, wherein an output of the evaluation device is connected with a control unit which controls a current supply unit of the primary inductor, and in that a signal produced at the output which indicates the presence of a foreign body triggers deactivation of the current supply of the primary inductor by the control device.

11. Device according to claim 10, wherein reactivation of the current supply of the primary inductor by the control device is triggered by the evaluation device through the output connected with the control unit when the signal which indicates the presence of a foreign body is no longer produced.

12. Device according to claim 1, wherein the evaluation device is combined with an evaluation device for signals of other sensors provided in or on the vehicle.

\* \* \* \* \*